United States Patent
Greenberg et al.

(10) Patent No.: US 11,334,810 B2
(45) Date of Patent: May 17, 2022

(54) ADIABATIC PROGRESSION WITH INTERMEDIATE RE-OPTIMIZATION TO SOLVE HARD VARIATIONAL QUANTUM PROBLEMS IN QUANTUM COMPUTING

(71) Applicant: International Business Machines Corporation, Armonk, NY (US)

(72) Inventors: Don Greenberg, Teaneck, NJ (US); Marco Pistoia, Amawalk, NY (US); Richard Chen, Mount Kisco, NY (US); Giacomo Nannicini, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 472 days.

(21) Appl. No.: 16/427,043

(22) Filed: May 30, 2019

(65) Prior Publication Data
US 2020/0327438 A1 Oct. 15, 2020

Related U.S. Application Data

(60) Provisional application No. 62/831,418, filed on Apr. 9, 2019.

(51) Int. Cl.
*G06N 10/00* (2022.01)
*G06N 5/02* (2006.01)
*B82Y 10/00* (2011.01)

(52) U.S. Cl.
CPC .............. *G06N 10/00* (2019.01); *B82Y 10/00* (2013.01); *G06N 5/02* (2013.01)

(58) Field of Classification Search
CPC .................................................... G06N 10/00
See application file for complete search history.

(56) References Cited

U.S. PATENT DOCUMENTS

| | | | |
|---|---|---|---|
| 7,418,283 | B2 | 8/2008 | Amin et al. |
| 8,244,650 | B2 | 8/2012 | Rose et al. |
| 10,176,433 | B2 | 1/2019 | Hastings et al. |
| 2015/0262074 | A1 | 9/2015 | Bruestle et al. |
| 2016/0055421 | A1 | 2/2016 | Adachi |
| 2018/0096085 | A1 | 4/2018 | Rubin |
| 2018/0314970 | A1 | 11/2018 | Harris et al. |
| 2019/0042392 | A1 | 2/2019 | Matsuura et al. |

OTHER PUBLICATIONS

Farhi et al. "A quantum approximate optimization algorithm," arXiv:1411.4028v1 (Year: 2014).*

(Continued)

*Primary Examiner* — Matthew L Reames
(74) *Attorney, Agent, or Firm* — Garg Law Firm, PLLC; Rakesh Garg; Joseph Petrokaitis

(57) ABSTRACT

A hybrid classical-quantum computing device to execute a quantum circuit corresponding to a variational problem, is configured. The configuring further comprises causing the hybrid classical-quantum computing device to execute the quantum circuit by performing an adiabatic progression operation, wherein the adiabatic progression operation comprises increasing the difficulty of the variational problem from a simplified version of the problem to the variational problem.

25 Claims, 10 Drawing Sheets

(56) References Cited

OTHER PUBLICATIONS

Nikolaj Moll et al., "Quantum optimization using variational algorithms on near-term quantum devices", Quantum Science and Technology, vol. 3, Jun. 19, 2018, pp. 1-17, XP055686421, ISSN: 2058-9565, 001:10.1088/2058-9565/aab822, abstract paragraph [0001]—paragraph [0006]; figures 1-4, paragraph [0008].

Jarrod R McClean et al., "The theory of variational hybrid quantum-classical algorithms", New Journal of Physics, Institute of Physics Publishing, Bristol, GB, vol. 18, No. 2, Feb. 5, 2016, pp. 1-22, XP020296316, ISSN: 1367-2630, DOI: 10.1088/1367-2630/18/2/023023.

International Searching Authority, PCT/EP2020/059733, dated Jul. 3, 2020.

List of IBM related applications, Appendix P, 2018.

\* cited by examiner

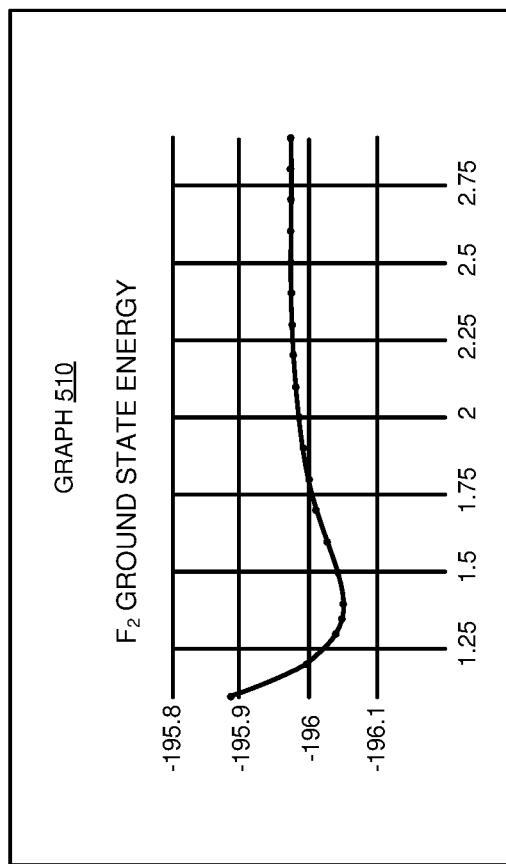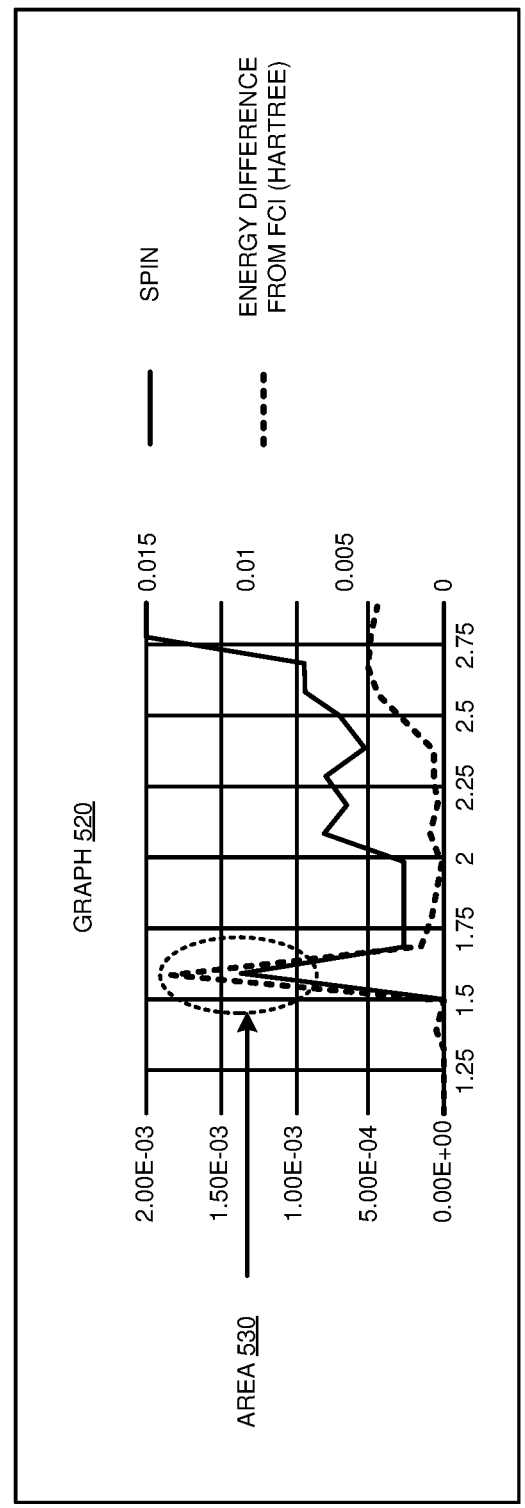
Fig. 5

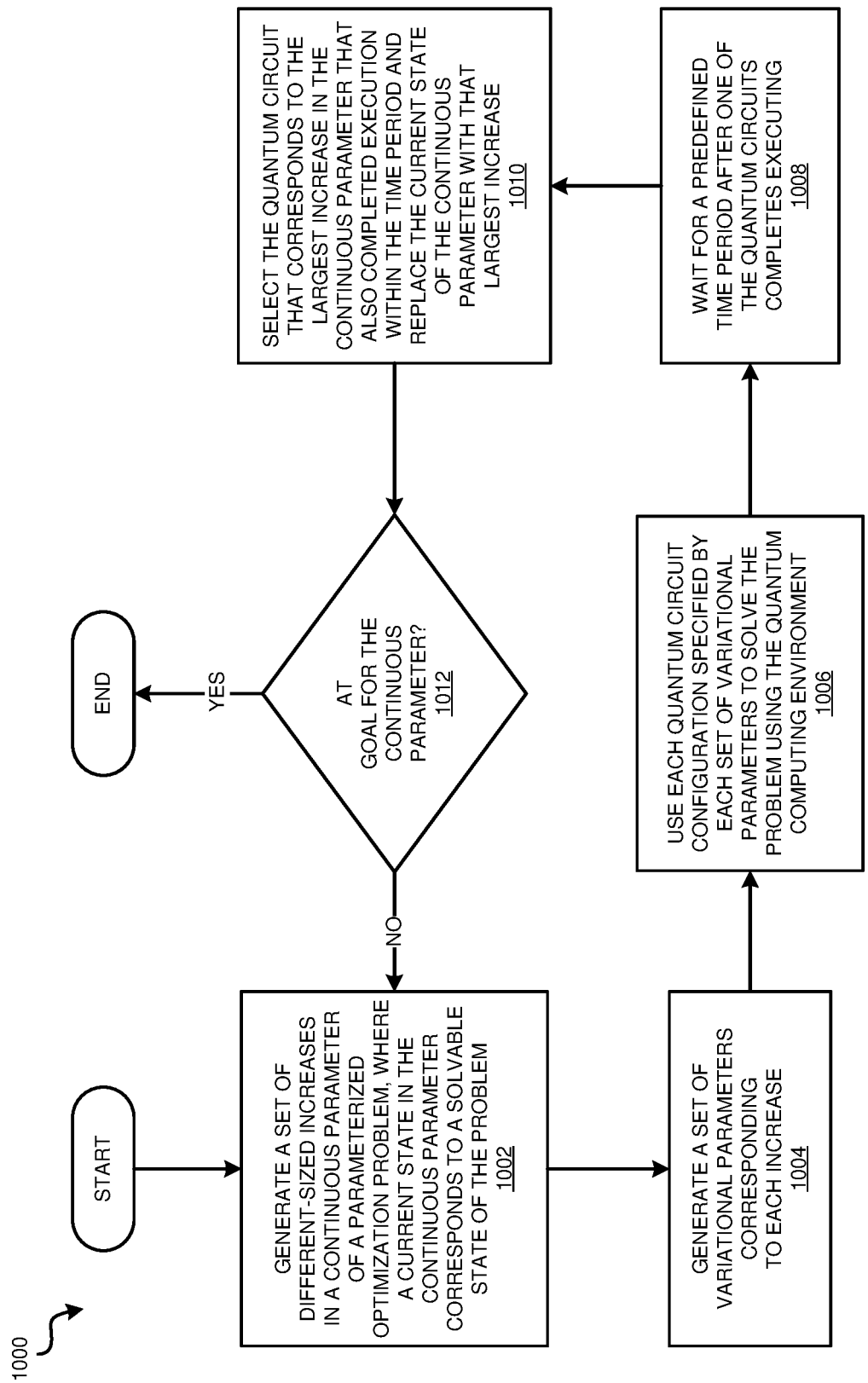

ADIABATIC PROGRESSION WITH INTERMEDIATE RE-OPTIMIZATION TO SOLVE HARD VARIATIONAL QUANTUM PROBLEMS IN QUANTUM COMPUTING

RELATED APPLICATION

This application claims priority to U.S. Provisional Application Ser. No. 62/831,418, filed Apr. 9, 2019, titled, "Adiabatic Progression with Intermediate Re-Optimization to Solve Hard Variational Quantum Problems in Quantum Computing", which is hereby incorporated by reference in its entirety.

TECHNICAL FIELD

The present invention relates generally to a method, system, and computer program product for operating a quantum computing data processing environment to solve certain types of problems. More particularly, the present invention relates to a method, system, and computer program product for adiabatic progression with intermediate re-optimization to solve hard variational quantum problems in quantum computing.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

A superconducting qubit includes a Josephson junction. A Josephson junction is formed by separating two thin-film superconducting metal layers by a non-superconducting material. When the metal in the superconducting layers is caused to become superconducting—e.g. by reducing the temperature of the metal to a specified cryogenic temperature—pairs of electrons can tunnel from one superconducting layer through the non-superconducting layer to the other superconducting layer. In a qubit, the Josephson junction—which functions as a dispersive nonlinear inductor—is electrically coupled in parallel with one or more capacitive devices forming a nonlinear microwave oscillator. The oscillator has a resonance/transition frequency determined by the value of the inductance and the capacitance in the qubit. Any reference to the term "qubit" is a reference to a superconducting qubit oscillator circuitry that employs a Josephson junction, unless expressly distinguished where used.

The information processed by qubits is carried or transmitted in the form of microwave signals/photons in the range of microwave frequencies. The microwave frequency of a qubit output is determined by the resonance frequency of the qubit. The microwave signals are captured, processed, and analyzed to decipher the quantum information encoded therein. A readout circuit is a circuit coupled with the qubit to capture, read, and measure the quantum state of the qubit. An output of the readout circuit is information usable by a q-processor to perform computations.

A superconducting qubit has two quantum states—I0> and I1>. These two states may be two energy states of atoms, for example, the ground (Ig>) and first excited state (Ie>) of a superconducting artificial atom (superconducting qubit). Other examples include spin-up and spin-down of the nuclear or electronic spins, two positions of a crystalline defect, and two states of a quantum dot. Since the system is of a quantum nature, any combination of the two states are allowed and valid.

For quantum computing using qubits to be reliable, quantum circuits, e.g., the qubits themselves, the readout circuitry associated with the qubits, and other parts of the quantum processor, must not alter the energy states of the qubit, such as by injecting or dissipating energy, in any significant manner or influence the relative phase between the I0> and I1> states of the qubit. This operational constraint on any circuit that operates with quantum information necessitates special considerations in fabricating semiconductor and superconducting structures that are used in such circuits.

Quantum computing can often be used to solve problems more quickly than in conventional computing. For example, one quantum algorithm is Grover's Search, which accomplishes searching through an unordered list of N items with fewer lookups than is the case in conventional computing.

Quantum gates are the elementary building blocks for quantum computation, acting on qubits the way classical logic gates act on bits, one and two at a time, to change qubit states in a controllable way. An X gate inverts the state of a single qubit, much like a NOT gate inverts the state of a single bit in classical computing. An H gate, or Hadamard gate, puts a single qubit into a state of superposition, a combination of the 0 and 1 quantum states. The qubit only resolves to a definite state when measured. For example, when provided with an input having a quantum state of 0, within the Hadamard gate the quantum state is in superposition, but the output has a 50 percent probability of being in the quantum 0 state and a 50 percent probability of being in the quantum 1 state. Other single-qubit gates alter the qubit state in other defined ways.

Multi-qubit gates implement gates that perform conditional logic between qubits, meaning the state of one qubit depends on the state of another. For example, a Controlled-NOT, or CNOT gate, has two qubits, a target qubit and a control qubit. If the control qubit is in the 1 quantum state, the CNOT gate inverts the state of the target qubit. If the control qubit is in the 0 quantum state, the CNOT gate does not change the state of the target qubit.

Multiple qubits can also be entangled. Two or more qubits are entangled when, despite being too far apart to influence one another, they behave in ways that are individually random, but also too strongly correlated to be explained by supposing that each object is independent from the other. As a result, the combined properties of an entangled multi-qubit system can be predicted, but the individual outcome of measuring each individual qubit in such a system cannot.

Similar to conventional computing, quantum computing gates can be assembled into larger groups, called quantum circuits, to perform more complicated operations. For example, a SWAP gate, which exchanges the states of a pair of qubits, can be constructed from three CNOT gates.

Quantum circuits can perform some operations in parallel, and some in series. The length of the longest series in the program is also referred to as the depth of the quantum circuit. For example, the three CNOT gates comprising a SWAP gate are arranged in series, giving a depth of 3. Programs with a shallower depth take less execution time and provide better performance, so are preferred.

Conventional computers do not have to be hand-programmed with specific instruction steps, such as those provided in processor-specific assembly languages. Instead, programmers write hardware-independent code in a higher-level language, and a compiler translates this code into assembly language for execution on a specific processor. Similarly, in quantum computing programmers do not have to specify individual gates. Instead, programmers can write higher-level code in a higher-level language. A compiler parses this code and maps it into a quantum circuit. Finally, a quantum processor executes the quantum circuit. Quantum programmers can also make use of already-programmed libraries, for use in solving problems in areas such as chemistry, artificial intelligence, and optimization.

A class of problems exists called variational problems, of which there are subclasses—hard variational problems and easy variational problems. Optimization problem is a non-limiting example of variational problems, which can be hard or easy depending on the dimensionality, numerosity of nodes, level of accuracy desired, and other factors. An optimization problem is a computational problem in which the best or optimal solution is to be determined for a different problem where the different problem has several possible solutions.

For example, the different problem can be the famous traveling salesman problem where a route has to be determined between several cities such that a traveling salesman covers each of the of cities without revising any of the cities. This problem has many possible solutions—routes between the cities. An optimization problem related to the traveling salesman problem is to find the shortest—i.e., the best or most optimal route—from the many possible routes, each of which satisfies the requirements of the traveling salesman problem.

Another example of the different problem is the max cut problem. In a graph, solving the max cut problem means a subset S of the vertex set such that the number of edges between S and the complementary subset (the subset of vertices not in S) is as large as possible.

Computing a dissociation curve is another non-limiting example of variational problems, which can be hard or easy depending on the dimensionality, level of accuracy desired, and other factors. A dissociation curve plots, on a graph, an energy cost of pulling apart atoms in a molecule. The x-axis of the graph is the distance between atoms, and the y-axis of the graph is an amount of energy.

Configuring a variational problem for execution on a computer so that the computer can compute the optimal solution in polynomial time is a difficult problem in itself. Until recently, the only computing resources available for executing variational problems were the conventional computers as described herein. Many variational problems are too difficult or too complex for conventional computers to compute in polynomial time with reasonable resources. Generally, an approximated solution which can be computed in reasonable time and with reasonable resources is accepted as the near-optimal solution in such cases.

The advent of quantum computing has presented advancement possibilities in many areas of computing, including the computation of variational problems. Because a quantum computing system can evaluate many solutions from the solution space at once, the illustrative embodiments recognize that such systems are particularly suitable for solving variational problems.

Variational quantum algorithms use classical optimizers to search a high-dimensional non-convex parameter space for a quantum circuit solving a particular problem. In general, optimization in high-dimensional non-convex spaces is very hard, and convergence to a solution becomes increasingly difficult as (meaningful) dimensionality increases. For quantum variational problems, this means it will be very difficult, if not impossible, to solve most problems requiring optimization in high-dimensional non-convex spaces with the present technology. State-of-the-art chemistry or combinatorial optimization problems can require thousands of variational parameters to dependably converge, while modern methods usually struggle to converge with only a few dozens of such parameters. The system that is the subject of the present invention has allowed us to improve the prospects of convergence for chemistry and optimization problems, where convergence to a desired degree of accuracy was previously impossible. Related topics include bootstrapping for improving dissociation curve convergence, gate-based quantum adiabatic methods, homotopy methods for convex optimization, and interior point methods for optimization.

SUMMARY

The illustrative embodiments provide a method, system, and computer program product. An embodiment includes a method for adiabatic progression with intermediate re-optimization to solve hard variational quantum problems in quantum computing. An embodiment configures a hybrid classical-quantum computing device to execute a quantum circuit corresponding to a variational problem. The configuring further comprises causing the hybrid classical-quantum computing device to execute the quantum circuit by performing an adiabatic progression operation, wherein the adiabatic progression operation comprises increasing the difficulty of the variational problem from a simplified version of the problem to the variational problem.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts an example of a hard variational quantum problem suitable for solving using adiabatic progression with intermediate re-optimization to solve hard variational quantum problems in quantum computing, in accordance with an illustrative embodiment;

FIG. 10 depicts a flowchart of another example process for adiabatic progression with intermediate re-optimization to solve hard variational quantum problems in quantum computing in accordance with an illustrative embodiment.

DETAILED DESCRIPTION

Figure 1:
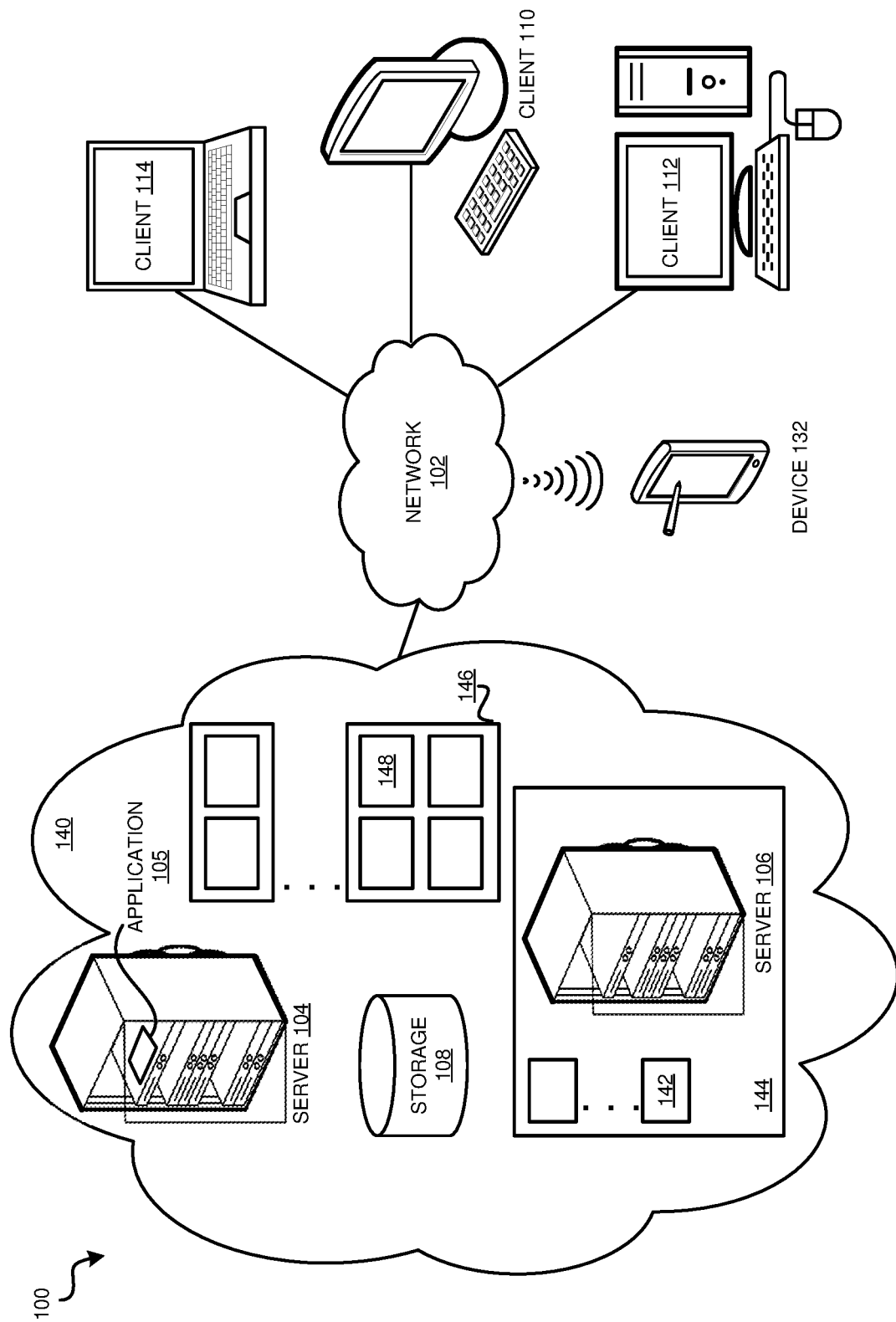
FIG. 1 depicts a block diagram of a network of data processing systems in which illustrative embodiments may be implemented.

Computing of variational problems is a well-recognized technological field of endeavor. Quantum computing using processors formed from quantum qubits is another well recognized technological field of endeavor. The present state of the technology in a combination of these two fields of endeavor has certain drawbacks and limitations. The operations and/or configurations of the illustrative embodiments impart additional or new capabilities to improve the existing technology in these technological fields of endeavor, especially in adiabatic progression with intermediate re-optimization to solve hard variational quantum problems in quantum computing.

The illustrative embodiments recognize that solving a problem, such as an optimization problem, in quantum computing typically requires translating the optimization problem, along with its inputs, into an Ising Hamiltonian, and then passing the Ising Hamiltonian to a quantum variational algorithm, such as the Variational Quantum Eigensolver (VQE) algorithm and the Quantum Approximate Optimization Algorithm (QAOA).

Ising (Z. Physik, 31, 253, 1925) introduced a model consisting of a lattice of "spin" variables si, which can only take the values +1 (↑) and −1 (↓). Every spin interacts with its nearest neighbors (2 in 1D) as well as with an external magnetic field h. See an example 1-dimensional Ising model, FIG. 3.

The Hamiltonian of the example Ising model is $$H(\{s_i\}) = -J\sum_{(i,j)} s_i s_j - h\sum_i s_i$$

The sum $<i, j>$ is over nearest neighbors ($j=i\pm1$ in 1D).

J is a constant specifying the strength of interaction. The term "spin" and "magnetic field" in the Ising model originate from its initial application to the phenomenon of spontaneous magnetization in ferromagnetic materials such as iron. Each iron atom has an unpaired electron and hence a net spin (or magnetic moment). At low temperature, the spins spontaneously align giving rise to a non-zero macroscopic magnetic moment. The macroscopic magnetic moment disappears when the temperature exceeds the Curie temperature (1043 K for iron).

The Ising model can be applied to many other problems beyond magnetism, such as phase separation in binary alloys, crystal growth, and solving optimization problems. Higher dimension Ising models are generally used in solving many problems.

2D Ising model defined over a square lattice of N spins under periodic boundary conditions. Again, the Hamiltonian can be written as $$H(\{s_i\}) = -J\sum_{(i,j)} s_i s_j - h\sum_i s_i$$

J describes the strength of interaction, h is external magnetic field, and the sum is over all $<i, j>$ nearest neighbor pairs. Each spin has 4 nearest neighbors.

Optimization and other variational problems are computation-intensive tasks. A thorough analysis of a solution space of an optimization or other variational problem can easily take several years on a commercially available conventional computer. Therefore, the illustrative embodiments also recognize that computing the optimal solution in a time-efficient manner using quantum computers is even more difficult using the presently available methods.

The illustrative embodiments solve a hard variational problem to a desired degree of accuracy by beginning with a simplified version of the problem, which can be solved to the user's degree of accuracy, and by then carefully increasing the complexity of the problem while solving each more complex problem along the way, until finally the desired problem is solved. Increasing the complexity of the problem, while solving each more complex problem along the way, is also referred to herein as adiabatic progression. As an example, in the case of dissociation curves in chemistry, this can mean starting with an easy section of the dissociation curve and progressing the Hamiltonian toward harder, more excited sections of the curve. As another example, in optimization problems in which the target system is represented as a graph, it can mean beginning with only a few nodes or components to the problem, and then gradually increasing the number of singular points.

Critically, the illustrative embodiments provide methods to control the pace at which to progress the difficulty of the problem, which is the primary challenge here (attempting to solve the problem directly can be seen as poor pacing—jumping from the easy problem to the full problem in one step). If a step is paced too aggressively, the starting point of the intermediate optimization may jump out of the basin of attraction, which includes the desired solution, making the optimizer much less likely to find the solution, or causing it to take much longer to converge.

An illustrative embodiment controls this pacing to ensure that intermediate solutions reach the user's desired level of accuracy. Some example problems with the current technology, and improvements of the illustrative embodiments over the existing technology are as follows. First, a method of the illustrative embodiments has been used with the "rewind" method below to complete dissociation curves and maxcut problems to degrees of accuracy which previously were impossible by solving with the variational algorithm directly, or via "bootstrapping" (a form of extrapolation with window depth equal to 1). Second, the improvement over using classical homotopy or interior-point methods is that an embodiment is able to use a quantum solution—the wave functions of the intermediate solutions can maintain exponentially many probabilities compared to the size of the problem. Lastly, in the near future, quantum hardware will be large enough that we will be unable to verify classically the solutions of quantum algorithms, and the issue of increasing the dependability of our quantum computations is pressing.

The illustrative embodiments recognize that the presently available tools or solutions do not address these needs or provide adequate solutions for these needs. The illustrative embodiments used to describe the invention generally address and solve the above-described problems and other related problems by adiabatic progression with intermediate re-optimization to solve hard variational quantum problems in quantum computing.

An embodiment can be implemented as a software application. The application implementing an embodiment, or one or more components thereof, can be configured as a modification of an existing quantum-classical hybrid data processing system—i.e., a native application in the classical computing system that produces inputs for a quantum computing system, as an application executing in a classical data processing system communicating with an existing quantum computing system over a network, as a separate application that operates in conjunction with an existing quantum-classical system in other ways, a standalone application for execution on a classical system, or some combination thereof.

An embodiment configures a hybrid data processing environment including a classical computing environment and a quantum computing environment. In accordance with the illustrative embodiments, the environment includes at least one quantum compute node (QCN), and at least one conventional node (CN) on which an embodiment can execute. Such a computing environment is hereinafter referred to as a quantum computing environment (QCE). The QCE may include one or more CNs in a suitable configuration—such as a cluster—to execute applications using conventional binary computing. The hybrid environment can be, but need not necessarily be implemented using a cloud computing architecture. To solve a given problem, an embodiment produces, in the classical computing environment, a quantum circuit that is executed using the quantum computing environment.

An embodiment works as follows: when supplied a parametrized problem, with a single continuous parameter z, with the property that the problem corresponding to $z=0$ is easy to solve, and the problem corresponding to $z=1$ (or some higher, user specified z) is the target (potentially difficult) problem that an embodiment is to solve. For example, if the problem to solve is an optimization on a graph (such as max cut), the parametrized problem could control the number of edges in the graph, where with $z=0$ the graph has one edge (and the problem is easy to solve), and with $z=1$ the graph has all the edges in the original problem instance. In one embodiment, a smooth progression from the easy problem ($z=0$) to the hard problem ($z=1$) is available (this is studied in detail in the fields of homotopy optimization and interior point methods).

An embodiment starts with the known easy problem. The easy problem has a corresponding continuous parameter z. The continuous parameter z has a corresponding set of variational parameters. The set of variational parameters defines a configuration of a quantum circuit that can be used to solve the problem. Thus, to increase the complexity of the problem, an embodiment increases the continuous parameter z by an amount, thus correspondingly changing the set of variational parameters. The changed set of variational parameters defines a new configuration of a quantum circuit, which can be used to attempt to solve the more-complex problem.

An embodiment can follow one of many methods, including one or both of a rewind embodiment and a race embodiment, to perform the complexity increases. Each method performs the complexity increases differently.

A rewind embodiment is suitable for use when a known correct solution to the problem can also be obtained by another means. A rewind embodiment starts with the continuous parameter z in the easy state, and increases z to the goal state (i.e. the maximum z). A rewind embodiment generates a set of variational parameters corresponding to the new z. A rewind embodiment then uses the quantum circuit configuration defined by the set of variational parameters to attempt to solve the problem. A rewind embodiment compares the output of the quantum circuit to a known correct solution to the problem obtained by another means (such as by using some form of polynomial-time validation of the solution, or by comparing to an exact classical solution). If the output of the quantum circuit is below a threshold difference from the known-correct solution, the embodiment has solved the hard problem, meeting the goal. If, instead, the output of the quantum circuit is above a threshold difference from the known-correct solution, or the quantum circuit fails to complete execution and produce a solution within a predetermined time period, the rewind embodiment concludes that the increase in z has been too large.

If the increase in z has been too large, a rewind embodiment selects a smaller increase in z from the starting point. In one embodiment, the smaller increase in z is half the size of the previous increase. In another embodiment, the smaller increase in z is ⅓. In another embodiment, the smaller increase is 1/n multiplied by the size of the previous increase, where n is any positive whole number greater than 1. In another embodiment, the smaller increase can be selected using another suitable method.

Once a rewind embodiment has determined a smaller increase, the embodiment repeats the process of generating a set of variational parameters corresponding to the new z, then using the quantum circuit configuration defined by the new set of variational parameters to attempt to solve the problem. If the new z succeeds in solving the problem, the embodiment makes the new z the starting point, and attempts to increase z in a manner described herein.

If the new z does not succeed in solving the problem, a rewind embodiment selects an even smaller increase in z from the starting point. In one embodiment, the even smaller increase is 1/n multiplied by the size of the previous increase, where n is any positive whole number greater than 1. In another embodiment, the smaller increase can be selected using another suitable method. Once a rewind embodiment has determined the even smaller increase, the embodiment repeats the process of generating a set of variational parameters corresponding to the new z, then using the quantum circuit configuration defined by the new set of variational parameters to attempt to solve the problem.

A rewind embodiment repeats the process until it arrives at an increase in z from the starting point that does solve the problem. The embodiment makes the new z the starting point, and attempts to increase z once again in a manner described herein. Thus, a rewind embodiment proceeds to increase z as much as possible in each step until the embodiment generates a correct quantum circuit configuration with a goal value of z.

Thus, if each increase is smaller than a previous increase, the operations of a rewind embodiment can be understood as performing a search (e.g. binary search, when each increase is one-half of the previous increase) for the next point which lies inside the basin of attraction when using the predecessor's variational parameters. This search is limited by the possibility of rewinding infinitely and never making progress, so in practice the search preferably should choose not to see or use some points very close to the predecessor.

A race embodiment is suitable for use if no method of validation is available. A race embodiment uses one or more pseudo-validation methods to select one of several possible successor points. For example, in one race embodiment, the difference in time to converge to an optimal point with a gradient-based optimizer when inside vs. outside the basin of attraction is used as a pseudo-condition on progressing. Meaning, if the embodiment determines that points inside the basin of attraction converge very quickly, and points outside the basin take 10× longer, then the embodiment can "race" the executions of these points against one another to choose the next point.

Thus, a race embodiment starts with the continuous parameter z in the easy state, and generates a set of increases in z from the starting point. In one embodiment, each of the set of increases is a fixed distance from the previous increase, dividing a range from the starting point to the goal state into equally-sized segments. Another embodiment uses equally-sized segments, but only up to an intermediate state instead of the goal state. Another embodiment uses unequally-sized segments, selected based on known characteristics of the problem to be solved to maximize a chance at arriving at a solvable state of the problem. For example, the increases could be smaller near one value of z and larger near another value of z. Another embodiment uses another suitable method of generating the set of increases.

For each new z in the set, a race embodiment generates a set of variational parameters corresponding to each new z. A race embodiment then uses the quantum circuit configuration defined by each set of variational parameters to attempt to solve the problem.

Each of the quantum circuit configurations executes in parallel. Because execution times of the set of quantum circuits tend to cluster, a race embodiment records a time at which a first quantum circuit completes execution. From that time, an embodiment waits an additional period of time for other circuits in the set to complete execution. In one embodiment, the additional time period is the same as the time to completion of the first circuit. In another embodiment, the additional time period is the twice the time to completion of the first circuit. In one embodiment, the additional time period is three times the time to completion of the first circuit. Other embodiments are configurable to use an adjustable time period, such as five times or ten times the time to completion of the first circuit, or an absolute time period (e.g. ten seconds, or one minute).

An embodiment considers any circuit that completes execution within the additional period of time as a potential solution to the problem. Because any circuits that are still executing at the end of the additional period of time are not potential solutions to the problem, an embodiment stops execution of these circuits. An embodiment selects the largest value of z that corresponds to a circuit in the group of solutions. The embodiment makes the new z the starting point, and attempts to increase z once again in a manner described herein. Thus, a race embodiment proceeds to increase z as much as possible in each step until the embodiment reaches a goal value of z.

Another embodiment of a pseudo-validation method uses comparison of the computed variational cost function for each of the candidate points and their respective extrapolated parameters.

When an embodiment reaches the goal value of the continuous parameter z, having solved the hard problem, it terminates and returns the problem solution. If an embodiment fails to reach the goal value of z, the embodiment returns the value of z that was reachable, and the solution to the corresponding level of complexity of the problem.

An embodiment described herein provides a method to solve chemistry, machine learning, and optimization problems using adiabatic progression, but without having to perform the expensive trotterization or hamiltonian exponentiation steps which make QAOA or adiabatic simulation untenable for Noisy Intermediate Scale Quantum (NISQ) devices. An embodiment produces very square circuits, which are optimally suited for NISQ devices. An embodiment controls the exact pace at which to progress the difficulty of the problem.

The manner of adiabatic progression with intermediate re-optimization to solve hard variational quantum problems in quantum computing described herein is unavailable in the presently available methods in the technological field of endeavor pertaining to quantum computing, particularly to operating a quantum data processing environment to solve hard variational problems. A method of an embodiment described herein, when implemented to execute on a device or data processing system, comprises substantial advancement of the functionality of that device or data processing system in adiabatic progression with intermediate re-optimization to solve hard variational quantum problems in quantum computing.

The illustrative embodiments are described with respect to certain types of algorithms, libraries, code, instructions, dimensions, data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
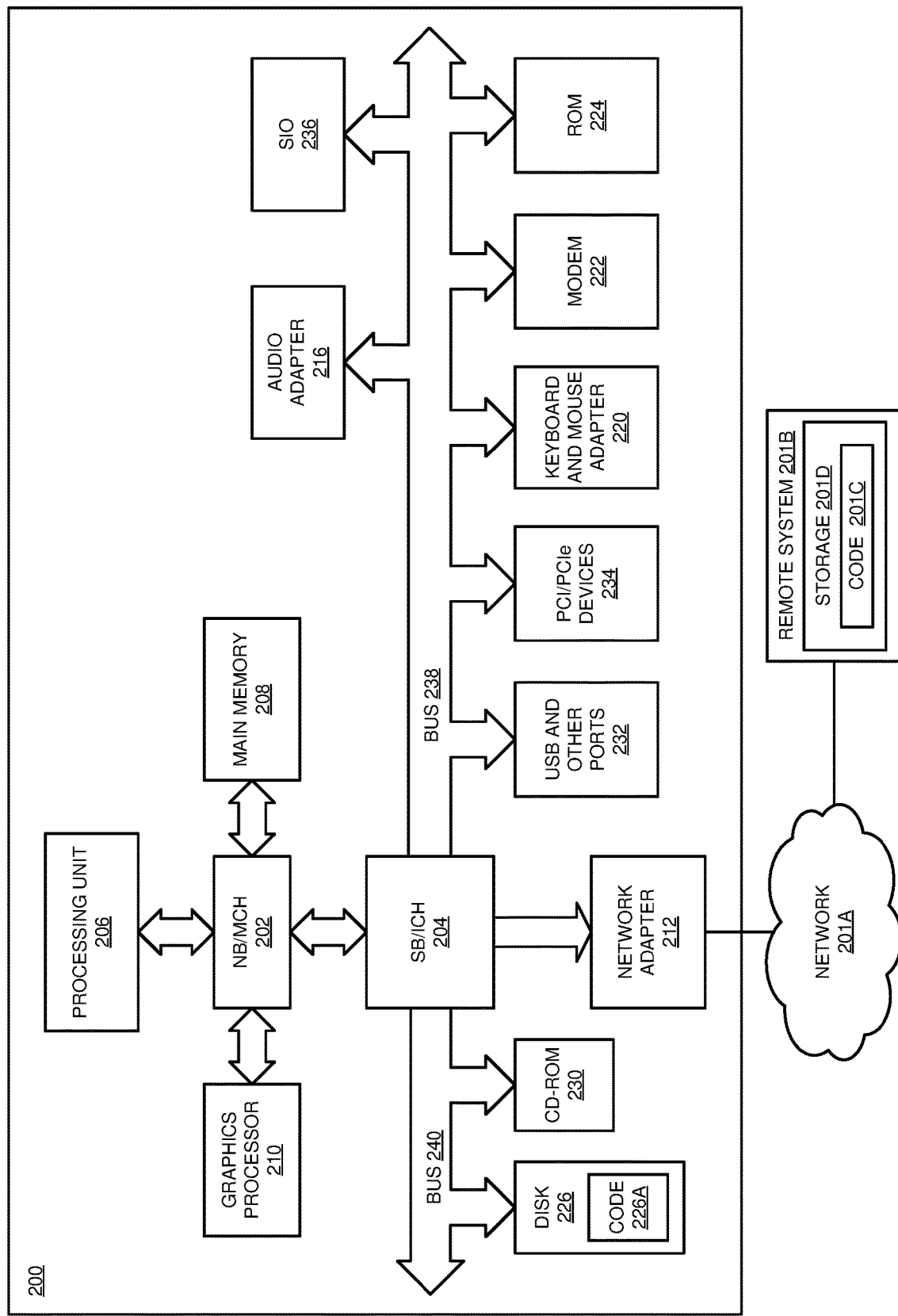
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of classical computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 are classical data processing systems and couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner Any data or information stored or produced in another data processing system in FIG. 1 can be configured to be stored or produced in device 132 in a similar manner.

QCE 140 is an example of a QCE described herein. As an example, QCE 140 includes CN 104, 106, and many other similar CNs 142. As an example, CNs 106 and 142 may be configured as cluster 144 of CNs. QCE 140 further includes one or more QCNs, such as QCN 146. A QCN, such as QCN 146, comprises one or more q-processors 148. A currently viable qubit is an example of q-processor 148. Application 105 implements an embodiment described herein. Application 105 operates on a CN, such as server 104 in QCE 140. Application 105 stores an operation library, circuits, and metadata in storage 108, or in any other suitable storage.

QCE 140 may couple to network 102 using wired connections, wireless communication protocols, or other suitable data connectivity. Clients 110, 112, and 114 may be, for example, personal computers or network computers. Network 102 may represent a collection of networks and gateways that use the Transmission Control Protocol/Internet Protocol (TCP/IP) and other protocols to communicate with one another. FIG. 1 is intended as an example, and not as an architectural limitation for the different illustrative embodiments.

Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
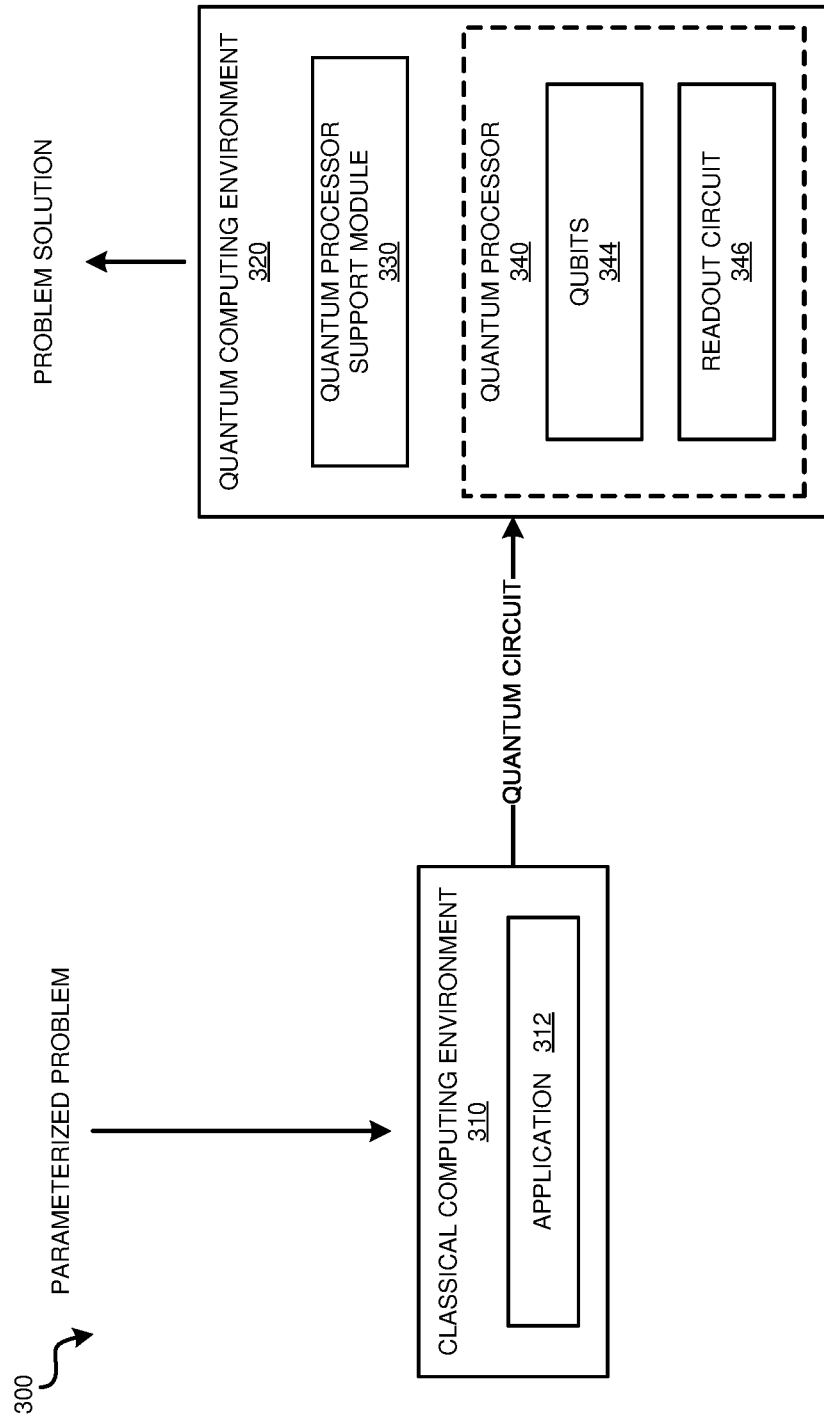
FIG. 3 depicts a block diagram of an example configuration for adiabatic progression with intermediate re-optimization to solve hard variational quantum problems in quantum computing, in accordance with an illustrative embodiment.

With reference to FIG. 3, this figure depicts a block diagram of an example configuration for adiabatic progression with intermediate re-optimization to solve hard variational quantum problems in quantum computing, in accordance with an illustrative embodiment. Cloud 300 is an example of QCE 140 in FIG. 1. Classical computing environment 310 is an example of CCN 104 in FIG. 1. Quantum computing environment 320 is an example of QCN 146 in FIG. 1. Application 312 is an examples of application 105 in FIG. 1 and executes in server 104 in FIG. 1, or any other suitable device in FIG. 1.

Within classical computing environment 310, application 312 receives a parametrized problem, with a single continuous parameter z, as an input. Application 312 generates quantum circuits corresponding to various values of z.

Then, within quantum computing environment 320, quantum processor 340, including qubits 344 and readout circuit 346, executes a quantum circuit. Quantum computing environment 320 also includes quantum processor support module 330, which outputs the results of executing the quantum circuit as a solution to the original input problem description.

Figure 4:
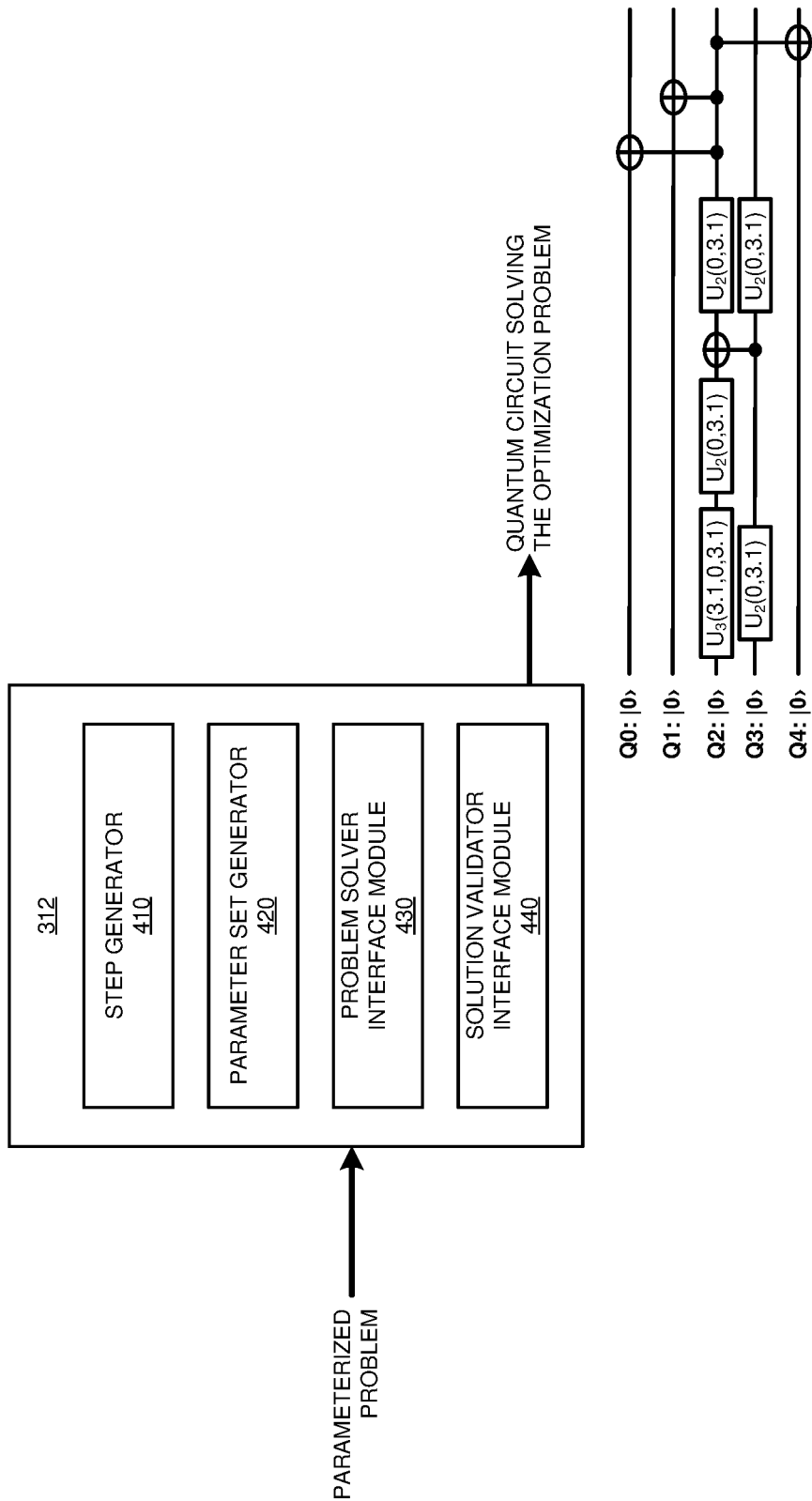
FIG. 4 depicts a block diagram of an example configuration for adiabatic progression with intermediate re-optimization to solve hard variational quantum problems in quantum computing, in accordance with an illustrative embodiment.

With reference to FIG. 4, this figure depicts a block diagram of an example configuration for adiabatic progression with intermediate re-optimization to solve hard variational quantum problems in quantum computing, in accordance with an illustrative embodiment. Application 312 is the same as application 312 in FIG. 3.

Application 312 receives, as input, a known easy problem. The easy problem has a corresponding continuous parameter z. Application 312 also receives, as input, a goal value of z, representing the desired complexity of the problem to be solved.

Step generator 410 generates one or more increases in the continuous parameter z. When implementing a rewind embodiment, module 410 starts with the continuous parameter z in the easy state, and increases z to the goal state (i.e. the maximum z). If the increase in z proves to be too large, module 410 selects a smaller increase in z from the starting point. If the new z succeeds in solving the problem, module 410 makes the new z the starting point, and increases z once again to the goal state or to another intermediate state between the new starting point or the goal state. Module 410 continues to increase z as much as possible in each step until application 312 generates a correct quantum circuit configuration with a goal value of z.

When implementing a race embodiment, module 410 starts with the continuous parameter z in the easy state, and generates a set of increases in z from the starting point. Once a group of corresponding quantum circuits completes execution, module 410 selects the largest value of z that corresponds to a circuit in the group of solutions. Module 410 makes the new z the starting point, and generates a new set of increases in z. Module 410 continues to increase z as much as possible in each step until application 312 generates a correct quantum circuit configuration with a goal value of z.

Parameter set generator 420 generates a set of variational parameters corresponding to each increase in z generated by step generator 410. The set of variational parameters defines a configuration of a quantum circuit that can be used to solve the problem.

Problem solver interface module 430 takes, as input, a quantum circuit configuration defined by the set of variational parameters. Module 430 passes the quantum circuit configuration on to quantum computing environment 320 for execution, and receives execution results back from quantum computing environment 320. Module 430 also monitors an execution time and completion time for a quantum circuit configuration.

Solution validator interface module 440 compares the output of the quantum circuit to a known correct solution to the problem obtained by another means (such as by using some form of polynomial-time validation of the solution, or by comparing to an exact classical solution).

With reference to FIG. 5, this figure depicts an example of a hard variational quantum problem suitable for solving using adiabatic progression with intermediate re-optimization to solve hard variational quantum problems in quantum computing, in accordance with an illustrative embodiment.

Graph 510 depicts a dissociation curve for a molecule of fluorine. Each fluorine molecule consists of two fluorine atoms. The x-axis of graph 510 is the distance between the two atoms, and the y-axis of graph 510 is an amount of energy. Thus, graph 510 plots an amount of energy needed to pull the two atoms apart when the atoms are at a particular distance from each other. Computing each point in a dissociation curve is a variational problem of a particular complexity.

Graph 520 corresponds to graph 510, and depicts two error measures, total spin and total energy compared to a classical calculation, associated with computing graph 510 using conventional methods. In particular, area 530 indicates an area where errors in computing points on the dissociation curve spike above a baseline. Thus, a point on the x-axis of the dissociation curve to the left of area 530 corresponds to an easier problem to solve. A point on the x-axis of the dissociation curve to the right of area 530 corresponds to a relatively harder problem to solve. A point on the x-axis of the dissociation curve within area 530 corresponds to the hardest problem to solve. If the problem of computing a dissociation curve is parametrized as a variational problem, points left of area 530 on the x-axis have a low value of z, points right of area 530 have a mid-scale value of z, and points within area 530 have a high value of z, where values of z are on a common scale (e.g. 0-1). A dissociation curve for fluorine is a non-limiting example. Many other dissociation curves have similar characteristics, and solving for points on such curves presents similar amounts of comparative computational complexity.

Figure 6:
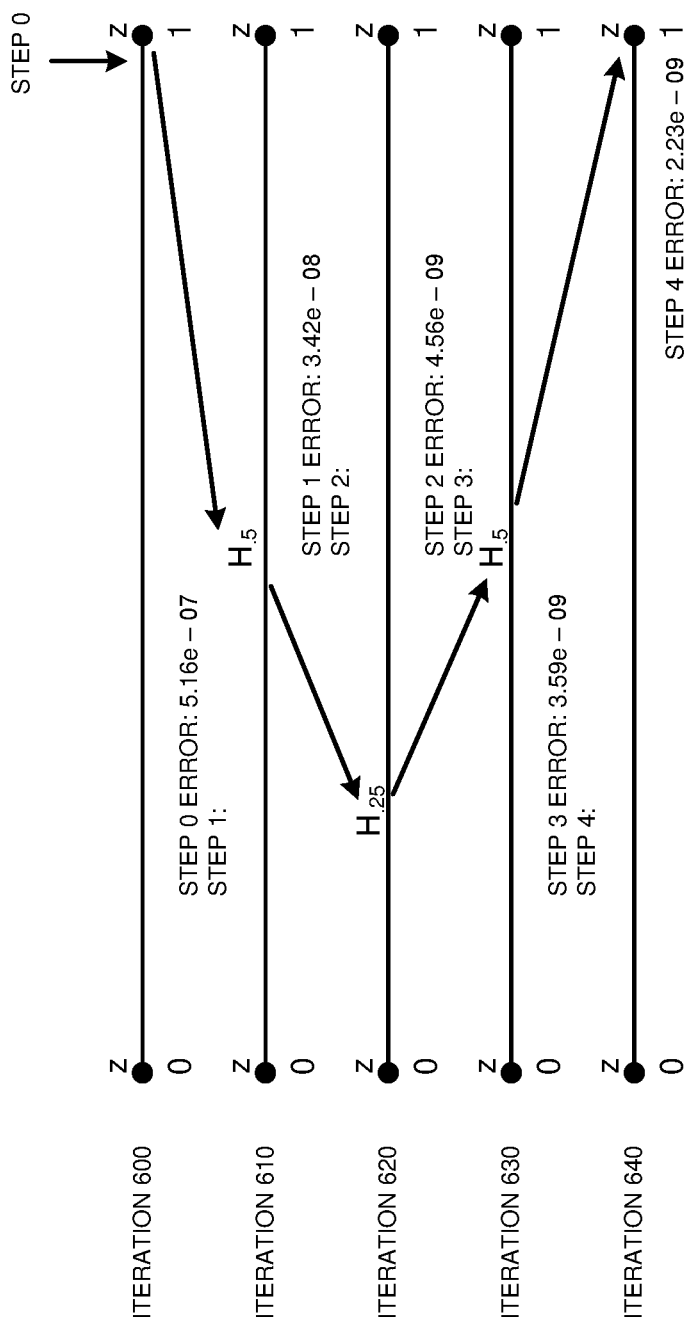
FIG. 6 depicts an example of solving a max cut problem using adiabatic progression with intermediate re-optimization, in accordance with an illustrative embodiment.

With reference to FIG. 6, this figure depicts an example of solving a max cut problem using adiabatic progression with intermediate re-optimization, in accordance with an illustrative embodiment. The problem can be solved using application 312 in FIG. 3, in a manner described herein.

As depicted, each iteration represents a location for a value of z, a continuous parameter parametrizing an optimization problem on a graph, such as max cut, from 0 to 1. With z=0 the graph has one edge (and the problem is easy to solve), and with z=1 the graph has all the edges in the original problem instance.

In iteration 600, application 312, using the rewind method, performs step 0, starting with the continuous parameter z in the easy state (0), and increasing z to the goal state (i.e. the maximum z, or 1). The application then uses the quantum circuit configuration defined by the set of variational parameters to attempt to solve the problem. The application compares the output of the quantum circuit to a known correct solution to the problem obtained by another means, and determines that the step 0 error is $5.16*10^{-7}$, above a predefined threshold difference from the known-correct solution. Thus, the application concludes that step 0, increasing z from 0 to 1, was too large.

In iteration 610, the application performs step 1, selecting a smaller increase in z from the starting point—here, half the size of the previous increase, or 0.5. The application then uses the quantum circuit configuration defined by the set of variational parameters to attempt to solve the problem. The application compares the output of the quantum circuit to a known correct solution to the problem obtained by another means, and determines that the step 1 error is $3.42*10^{-8}$, still above a predefined threshold difference from the known-correct solution. Thus, the application concludes that step 1, increasing z from 0 to 0.5, was also too large.

In iteration 620, the application performs step 2, selecting an even smaller increase in z from the starting point—here, half the size of the previous increase, or 0.25. The application then uses the quantum circuit configuration defined by the set of variational parameters to attempt to solve the problem. This time, the step 2 error is $4.56*10^{-9}$, below the predefined threshold difference from the known-correct solution.

As a result, in iteration 630, the application performs step 3, increasing z from 0.25 to 0.5, and obtaining the result of the corresponding quantum circuit configuration. This time, the step 3 error is $3.59*10^{-9}$, still below the predefined threshold difference from the known-correct solution.

As a result, in iteration 640, the application performs step 4, increasing z from 0.5 to 1, and obtaining the result of the corresponding quantum circuit configuration. This time, the step 4 error is $2.23*10^{-9}$, also below the predefined threshold difference from the known-correct solution. Because the error is below the threshold difference and z=1, the goal state of the problem has been solved.

The increases depicted in FIG. 6 do not depict additional steps that the application could have performed to reach the goal state. An application could have performed additional steps, fewer steps, or increases of different sizes without departing from the scope of the illustrative embodiments.

Figure 7:
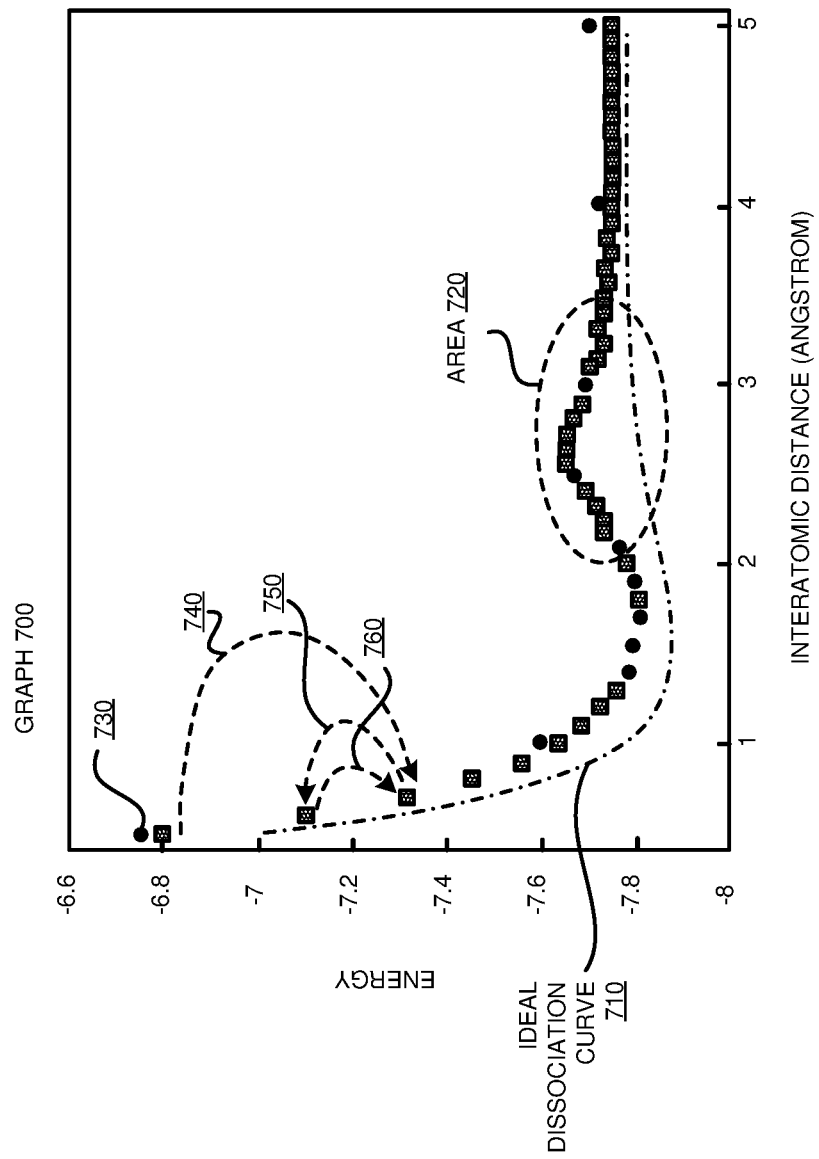
FIG. 7 depicts an example of computing a dissociation curve using adiabatic progression with intermediate re-optimization, in accordance with an illustrative embodiment.

With reference to FIG. 7, this figure depicts an example of computing a dissociation curve using adiabatic progression with intermediate re-optimization, in accordance with an illustrative embodiment. Points on the curve can be solved using application 312 in FIG. 3, in a manner described herein.

Graph 700 depicts points on a dissociation curve obtained using application 312. The x-axis of graph 700 denotes interatomic distance, measured in Angstroms, and the y-axis depicts dissociation energies. Graph 700 also depicts ideal dissociation curve 710, obtained using another method.

Area 720 depicts a portion of the x-axis known to have higher complexity, parametrized by a high value of z (e.g. close to 1 on a 0-1 scale). As a result, the application begins solving for points on the curve further to the left on the x-axis.

In particular, the application begins with point 730, which has been solved. In step 740, the application, using the rewind method, increases z to attempt to solve for a point having a x value higher than that of point 730. However, the application's initial solution is above a threshold difference from the point on curve 710 having the same x value.

As a result, in step 750 the application generates a smaller increase in z than that of step 740. The smaller increase results in a solution below a threshold difference from the point on curve 710 having the same x value.

As a result, the z value of step 750 becomes the new starting point. In step 760 the application once again increases z, to the same level as was attempted in step 740. Step 750 also results in a solution below a threshold difference from the point on curve 710 having the same x value. The application continues in a manner described herein until all the desired points on the dissociation curve have been solved for.

Figure 8:
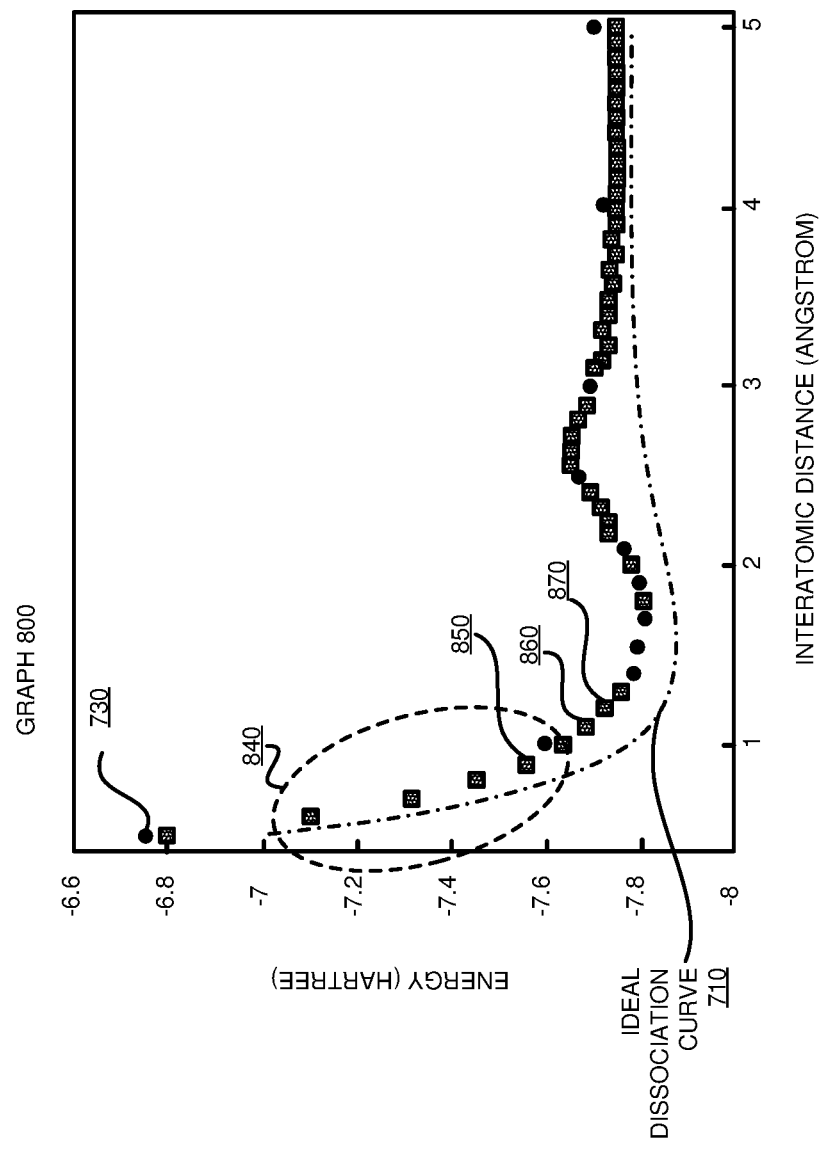
FIG. 8 depicts another example of computing a dissociation curve using adiabatic progression with intermediate re-optimization, in accordance with an illustrative embodiment.

With reference to FIG. 8, this figure depicts another example of computing a dissociation curve using adiabatic progression with intermediate re-optimization, in accordance with an illustrative embodiment. Points on the curve can be solved using application 312 in FIG. 3, in a manner described herein. Graph 700, curve 710, and point 730 are the same as graph 700, curve 710, and point 730 in FIG. 7.

The application begins with point 730, which has been solved. The application, using the race method, generates a set of increases in z to attempt to solve for points having x values higher than that of point 730. The application generates quantum circuits corresponding to the set of increases in z, and waits a predetermined time period for the quantum circuits to complete executing. At the end of the time period, all of the quantum circuits corresponding to area 840 have completed executing. The quantum circuits corresponding to points further to the right along the x-axis, for example, points 860 and 870, have not completed executing. Because point 850 represents the highest increase in z from point 730 corresponding to a circuit within area 840, the application selects the z value corresponding to point 850 as the new starting point and repeats the process. The application continues, in a manner described herein, until all desired points on the dissociation curve have been solved for.

Figure 9:
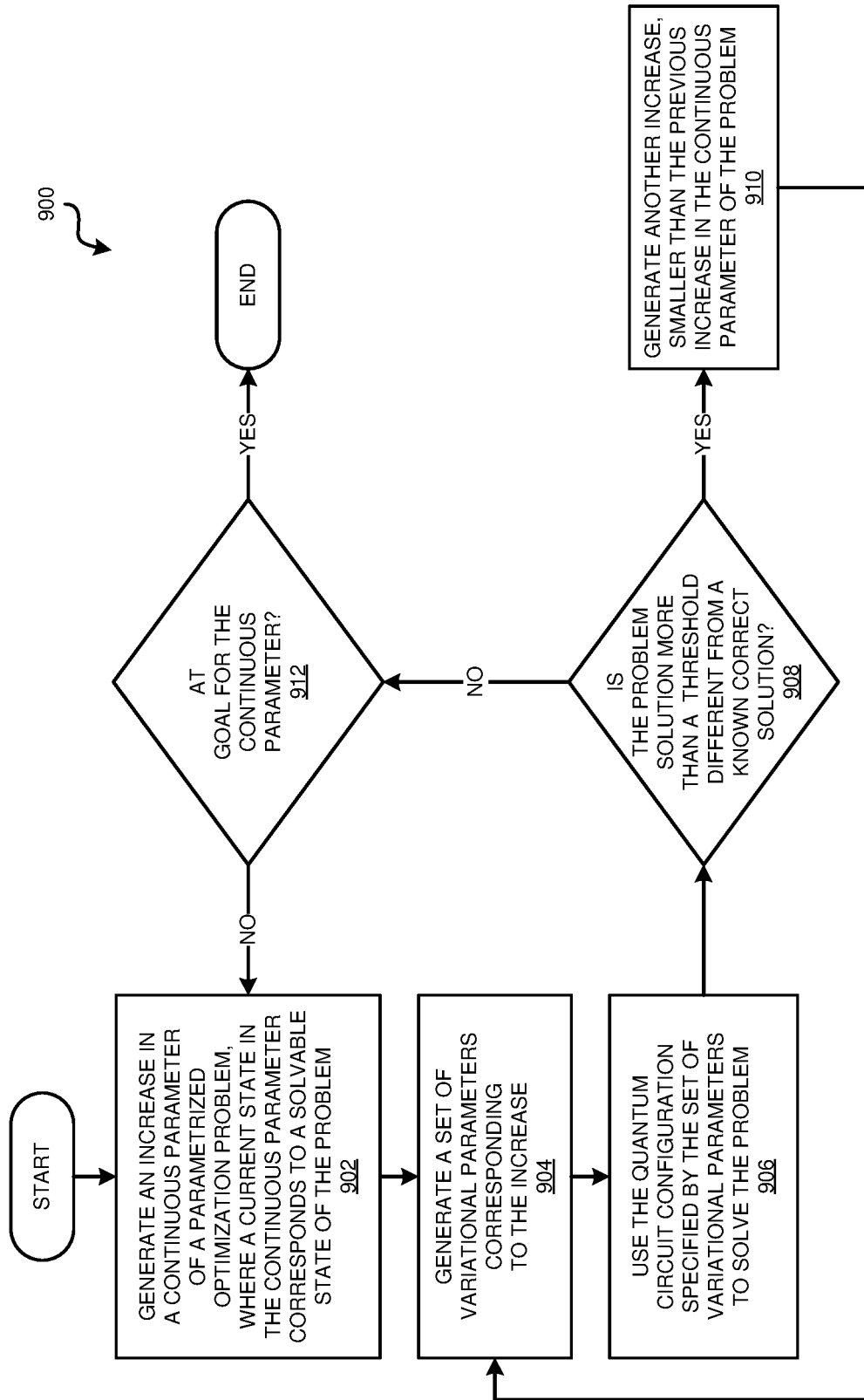
FIG. 9 depicts a flowchart of an example process for adiabatic progression with intermediate re-optimization to solve hard variational quantum problems in quantum computing in accordance with an illustrative embodiment.

With reference to FIG. 9, this figure depicts a flowchart of an example process for adiabatic progression with intermediate re-optimization to solve hard variational quantum problems in quantum computing in accordance with an illustrative embodiment. Process 900 can be implemented in application 312 in FIG. 3 or FIG. 4, and illustrates operation of a rewind method described herein.

In block 902, the application generates an increase in a continuous parameter of a parametrized optimization problem, where a current state in the continuous parameter corresponds to a solvable state of the problem. In block 904, the application generates a set of variational parameters corresponding to the increase. In block 906, the application uses the quantum circuit configuration specified by the set of variational parameters to solve the problem. In block 908, the application checks whether the problem solution is more than a threshold different from a known correct solution to the problem. If so ("YES" path of block 908), in block 910 the application generates another increase, smaller than the previous increase, in the continuous parameter of the problem, and then returns to block 904. Otherwise ("NO" path of block 908), in block 912 the application checks whether the continuous parameter z is at the goal state. If yes, the application ends. Otherwise ("NO" path of block 912), the application returns to block 902.

With reference to FIG. 10, this figure depicts a flowchart of another example process for adiabatic progression with intermediate re-optimization to solve hard variational quantum problems in quantum computing in accordance with an illustrative embodiment. Process 1000 can be implemented in application 312 in FIG. 3 or FIG. 4, and illustrates operation of a race method described herein.

In block 1002, the application generates a set of different-sized increases in a continuous parameter of a parametrized optimization problem, where a current state in the continuous parameter corresponds to a solvable state of the problem. In block 1004, the application generates a set of variational parameters corresponding to each increase. In block 1006, the application uses the quantum circuit configuration specified by each set of variational parameters to solve the problem. In block 1008, the application waits for a predetermined time period after one of the quantum circuits completes executing. In block 1010 the application selects the quantum circuit that corresponds to the largest increase in the continuous parameter that also completed execution within the time period, and replaces the current value of z with that largest increase. In block 1012 the application checks whether the continuous parameter z is at the goal state. If yes, the application ends. Otherwise ("NO" path of block 1012), the application returns to block 1002.

Thus, a computer implemented method, system or apparatus, and computer program product are provided in the illustrative embodiments for adiabatic progression with intermediate re-optimization to solve hard variational quantum problems in quantum computing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
generating a first increase from a current state of a continuous parameter of a parametrized optimization problem, wherein the current state of the continuous parameter corresponds to a first difficulty level of the parametrized optimization problem;
generating a set of variational parameters corresponding to the first increase, the set of variational parameters specifying a first configuration of a quantum circuit;
causing a hybrid classical-quantum computing device to execute the first configuration of the quantum circuit, execution of the first configuration of the quantum circuit resulting in a first output; and
causing, responsive to determining that a sum of the current state of the continuous parameter and the first increase in the continuous parameter is less than or equal to a goal state of the continuous parameter, the hybrid classical-quantum computing device to execute a second configuration of the quantum circuit, the second configuration of the quantum circuit specified by a second set of variational parameters generated from a second increase in the continuous parameter from the current state of the continuous parameter, wherein the goal state of the continuous parameter corresponds to a second difficulty level of the parametrized optimization problem higher than the first difficulty level.

2. The computer-implemented method of claim 1, wherein the hybrid classical-quantum computing device comprises a Noisy Intermediate Scale Quantum (NISQ) device.

3. The computer-implemented method of claim 2, wherein the first configuration of the quantum circuit comprises
a square quantum circuit, the square quantum circuit being suited for implementing on the NISQ device.

4. The computer-implemented method of claim 1, further comprising:
controlling, according to a value of the first increase in the continuous parameter, a pace at which to progress a difficulty level of the parametrized optimization problem.

5. The computer-implemented method of claim 4, wherein the first increase comprises a difference between the goal state of the continuous parameter and the current state of the continuous parameter.

6. The computer-implemented method of claim 4, wherein the first increase comprises a difference between the goal state of the continuous parameter and the current state of the continuous parameter, the difference then divided by n, where n is a positive whole number.

7. The computer-implemented method of claim 4, further comprising:
determining that the first output of the quantum circuit differs by more than a threshold amount from a known correct solution of the parametrized optimization problem, the known correct solution of the parametrized optimization problem obtained using a classical computing device; and
generating the second increase in the continuous parameter from the current state of the continuous parameter, wherein the second increase is smaller than the first increase.

8. The computer-implemented method of claim 7, wherein the second increase is 1/n multiplied by the first increase, where n is a positive whole number.

9. A computer usable program product comprising one or more computer-readable storage devices, and program instructions stored on at least one of the one or more storage devices, the stored program instructions comprising:

program instructions to generate a first increase from a current state of a continuous parameter of a parametrized optimization problem, wherein the current state of the continuous parameter corresponds to a first difficulty level of the parametrized optimization problem;

program instructions to generate a set of variational parameters corresponding to the first increase, the set of variational parameters specifying a first configuration of a quantum circuit;

program instructions to cause a hybrid classical-quantum computing device to execute the first configuration of the quantum circuit, execution of the first configuration of the quantum circuit resulting in a first output; and program instructions to cause, responsive to determining that a sum of the current state of the continuous parameter and the first increase in the continuous parameter is less than or equal to a goal state of the continuous parameter, the hybrid classical-quantum computing device to execute a second configuration of the quantum circuit, the second configuration of the quantum circuit specified by a second set of variational parameters generated from a second increase in the continuous parameter from the current state of the continuous parameter, wherein the goal state of the continuous parameter corresponds to a second difficulty level of the parametrized optimization problem higher than the first difficulty level.

10. The computer usable program product of claim 9, wherein the hybrid classical-quantum computing device comprises a Noisy Intermediate Scale Quantum (NISQ) device.

11. The computer usable program product of claim 10, wherein the first configuration of the quantum circuit comprises
a square quantum circuit, the square quantum circuit being suited for implementing on the NISQ device.

12. The computer usable program product of claim 9, further comprising:
program instructions to control, according to a value of the first increase in the continuous parameter, a pace at which to progress a difficulty level of the parametrized optimization problem.

13. The computer usable program product of claim 12, wherein the first increase comprises a difference between the goal state of the continuous parameter and the current state of the continuous parameter.

14. The computer usable program product of claim 12, wherein the first increase comprises a difference between the goal state of the continuous parameter and the current state of the continuous parameter, the difference then divided by n, where n is a positive whole number.

15. The computer usable program product of claim 12, further comprising:
program instructions to determine that the first output of the quantum circuit differs by more than a threshold amount from a known correct solution of the parametrized optimization problem, the known correct solution of the parametrized optimization problem obtained using a classical computing device; and
program instructions to generate the second increase in the continuous parameter from the current state of the continuous parameter, wherein the second increase is smaller than the first increase.

16. The computer usable program product of claim 15, wherein the second increase is 1/n multiplied by the first increase, where n is a positive whole number.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system, further comprising:
program instructions to meter use of the computer usable code associated with the request; and
program instructions to generate an invoice based on the metered use.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to generate a first increase from a current state of a continuous parameter of a parametrized optimization problem, wherein the current state of the continuous parameter corresponds to a first difficulty level of the parametrized optimization problem;

program instructions to generate a set of variational parameters corresponding to the first increase, the set of variational parameters specifying a first configuration of a quantum circuit;

program instructions to cause a hybrid classical-quantum computing device to execute the first configuration of the quantum circuit, execution of the first configuration of the quantum circuit resulting in a first output; and program instructions to cause, responsive to determining that a sum of the current state of the continuous parameter and the first increase in the continuous parameter is less than or equal to a goal state of the continuous parameter, the hybrid classical-quantum computing device to execute a second configuration of the quantum circuit, the second configuration of the quantum circuit specified by a second set of variational parameters generated from a second increase in the continuous parameter from the current state of the continuous parameter, wherein the goal state of the continuous parameter corresponds to a second difficulty level of the parametrized optimization problem higher than the first difficulty level.

20. The computer system of claim 19, wherein the hybrid classical-quantum computing device comprises a Noisy Intermediate Scale Quantum (NISQ) device.

21. The computer system of claim 20, wherein the first configuration of the quantum circuit comprises
a square quantum circuit, the square quantum circuit being suited for implementing on the NISQ device.

22. The computer system of claim 19, further comprising:
program instructions to control, according to a value of the first increase in the continuous parameter, a pace at which to progress a difficulty level of the parametrized optimization problem.

23. The computer system of claim 22, wherein the first increase comprises a difference between the goal state of the continuous parameter and the current state of the continuous parameter.

24. The computer system of claim 22, wherein the first increase comprises a difference between the goal state of the continuous parameter and the current state of the continuous parameter, the difference then divided by n, where n is a positive whole number.

25. The computer system of claim 22, further comprising:
program instructions to determine that the first output of the quantum circuit differs by more than a threshold amount from a known correct solution of the parametrized optimization problem, the known correct solution of the parametrized optimization problem obtained using a classical computing device; and
program instructions to generate the second increase in the continuous parameter from the current state of the continuous parameter, wherein the second increase is smaller than the first increase.

* * * * *